US012531758B2

(12) United States Patent
Dong et al.

(10) Patent No.: US 12,531,758 B2
(45) Date of Patent: Jan. 20, 2026

(54) MANAGING MULTICAST CONNECTIONS FOR CONTAINERS IN A COMPUTING NETWORK

(71) Applicant: VMware LLC, Palo Alto, CA (US)

(72) Inventors: Wenying Dong, Beijing (CN); Lan Luo, Beijing (CN); Ruochen Shen, Beijing (CN); Jianjun Shen, Redwood City, CA (US); Antonin Mathieu Bas, Menlo Park, CA (US)

(73) Assignee: VMware LLC, Palo Alto, CA (US)

( * ) Notice: Subject to any disclaimer, the term of this patent is extended or adjusted under 35 U.S.C. 154(b) by 568 days.

(21) Appl. No.: 17/945,435

(22) Filed: Sep. 15, 2022

(65) Prior Publication Data

US 2024/0039751 A1    Feb. 1, 2024

(30) Foreign Application Priority Data

Jul. 26, 2022  (WO) ................ PCT/CN2022/107856

(51) Int. Cl.
*H04L 12/18* (2006.01)
*H04L 1/1867* (2023.01)
*H04L 45/16* (2022.01)

(52) U.S. Cl.
CPC ............ *H04L 12/185* (2013.01); *H04L 1/188* (2013.01); *H04L 45/16* (2013.01)

(58) Field of Classification Search
CPC ....... H04L 12/185; H04L 1/188; H04L 45/16; H04L 1/1848; H04L 2001/0093
See application file for complete search history.

(56) References Cited

U.S. PATENT DOCUMENTS

| | | | |
|---|---|---|---|
| 2009/0293093 A1* | 11/2009 | Igarashi | H04N 21/6405 725/115 |
| 2014/0098815 A1* | 4/2014 | Mishra | H04L 45/021 370/390 |
| 2016/0285932 A1* | 9/2016 | Thyamagundalu | H04L 12/4633 |
| 2023/0179439 A1* | 6/2023 | Thubert | H04L 45/54 709/224 |

* cited by examiner

*Primary Examiner* — Charles C Jiang
*Assistant Examiner* — Rachel Elizabeth Marks
(74) *Attorney, Agent, or Firm* — Quarles & Brady LLP

(57) ABSTRACT

Described herein are systems, methods, and software to manage multicast communications for containers in a computing network. In one example, a first node is configured to monitor for registration packets from pods on the first node to join a multicast group. The first node further identifies a registration packet from a first pod of the pods, wherein the registration packet indicates a multicast IP address, and configures one or more forwarding rules in a virtual switch to direct packets with the multicast IP address as a destination IP address to a virtual interface for the first pod. Once configured, the first node is further configured to receive a packet with the multicast IP address as the destination and direct the packet based on the one or more or more forwarding rules.

20 Claims, 5 Drawing Sheets

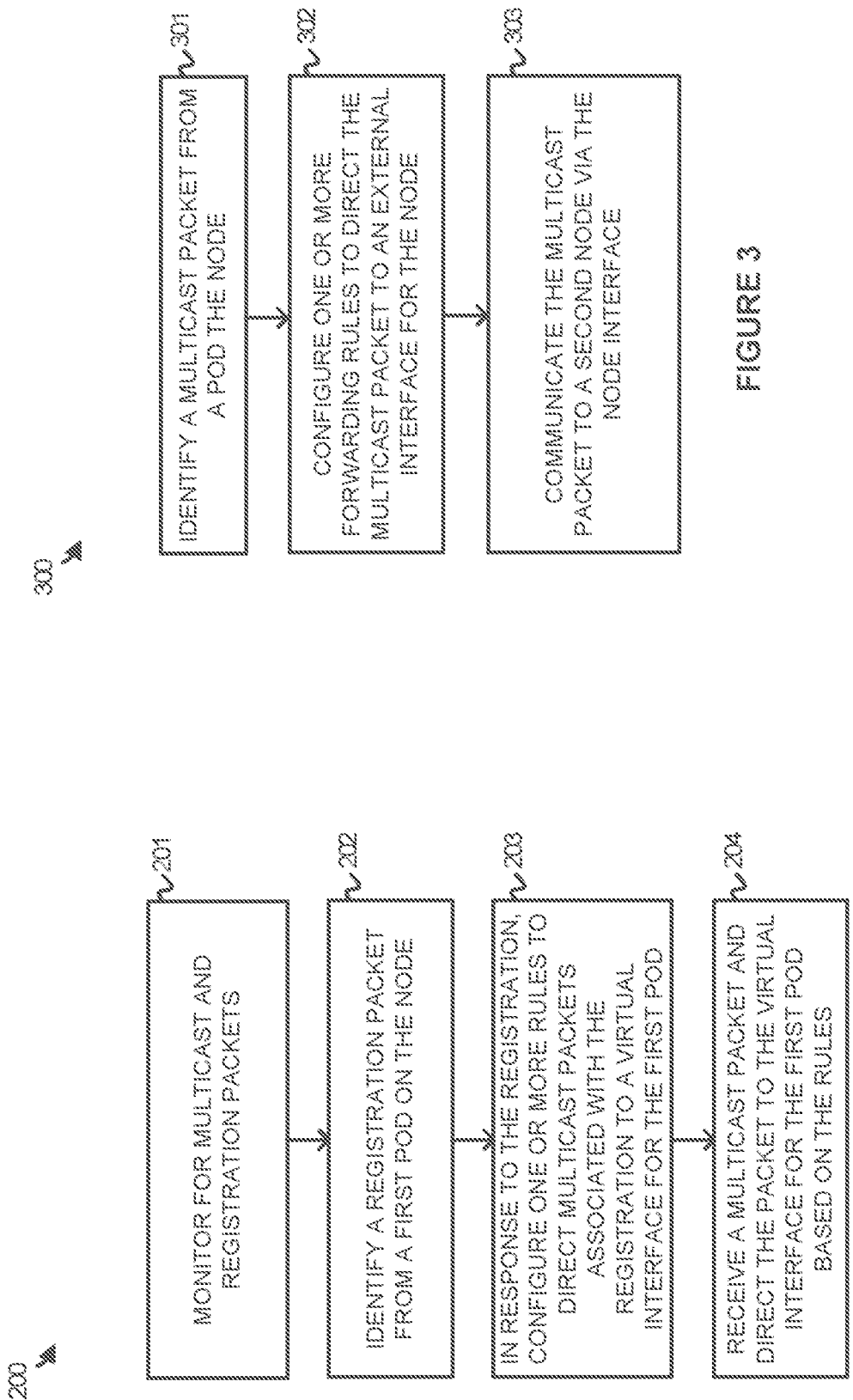

MANAGING MULTICAST CONNECTIONS FOR CONTAINERS IN A COMPUTING NETWORK

RELATED APPLICATIONS

This application claims benefit from and priority to PCT Application Serial No. PCT/CN2022/107856 filed in China entitled "MANAGING MULTICAST CONNECTIONS FOR CONTAINERS IN A COMPUTING NETWORK", on Jul. 26, 2022, which is herein incorporated in its entirety by reference for all purposes.

BACKGROUND

In computing environments, virtual switches may be used that comprise software modules capable of providing a communication platform for one or more virtual nodes (virtual machines, containers, and the like) in the computing environment. These virtual switches may be used to intelligently direct communications on the network by inspecting packets before passing them to other nodes on the same network. For example, packets may be inspected to determine the source and destination internet protocol (IP) addresses to determine if the communication is permitted to be delivered to a destination. In some implementations, virtual switches may be configured with forwarding rules or flow operations that indicate actions to be taken against a packet. These flow operations identify specific attributes, such as IP addresses, media access control (MAC) addresses, and the like, within the data packet and, when identified, provide a set of actions to be asserted against the data packet. These actions may include modifications to the data packet, forwarding rules for the data packet, amongst other possible operations.

In some computing environments, nodes, physical or virtual, can be used to support pods of containers, wherein each pod includes one or more containers. The pods can be coupled to a virtual switch using a veth pair that acts as a tunnel between network namespaces, such as the container namespace and the node namespace. However, while pods can be coupled to a virtual switch, difficulties can arise in managing the communications that are forwarded to the containers. These difficulties can be compounded when pods require the use of multiple IP addresses, including multicast addresses, in a computing environment.

OVERVIEW

The technology disclosed herein manages multicast connections for containers in a computing network. In one example, a method of operating a first node in a system of nodes comprises monitoring for registration packets from pods on the first node to join a multicast group and identifying a registration packet from a first pod of the pods, wherein the registration packet indicates a multicast IP address. The method further comprises in the first node and in response to the registration packet, configuring one or more forwarding rules in a virtual switch to direct packets with the multicast IP address as a destination IP address to a virtual interface for the first pod. Once configured, the method includes, in the first node, receiving a packet with the multicast IP address as a destination IP address and directing the packet to the virtual interface for the first pod based on the one or more forwarding rules.

In some implementations, the method further includes, in a second node of the system, identifying the packet with the multicast IP address as a destination IP address on the second node and communicating the packet via a network interface to the second node.

BRIEF DESCRIPTION OF THE DRAWINGS

FIG. 2 illustrates a method of operating a node to register a pod for multicast communications and forward multicast packets to the pod according to an implementation.

FIG. 3 illustrates a method of a node to communicate a multicast packet to a second node according to an implementation.

DETAILED DESCRIPTION

Figure 1:
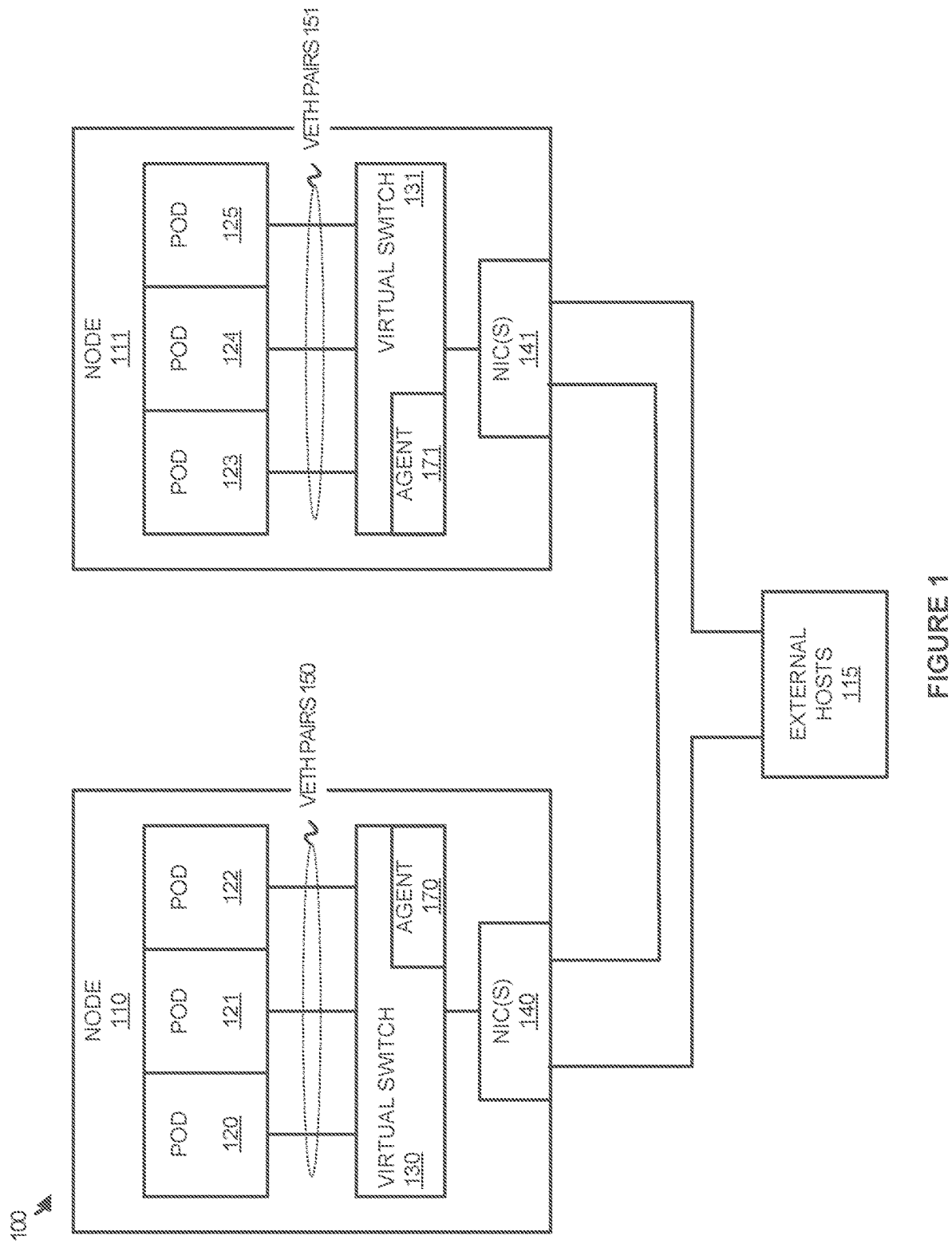
FIG. 1 illustrates a computing network to manage multicast connections for containers according to an implementation.

FIG. 1 illustrates a computing network 100 to manage multicast connections for containers according to an implementation. Computing network 100 includes nodes 110-111 and external hosts 115. Nodes 110-111 can comprise physical computers or virtual machines capable of acting as a platform for pods 120-125, virtual switches 130-131, and agents 170-171. Nodes 110-111 further includes network interfaces ("NIC(S)") 140-141, wherein network interfaces 140-141 can comprise physical interfaces or virtual interfaces in some examples. External hosts 115 can comprise physical computers capable of receiving or sending multicast communications. Although demonstrated with two nodes in the example of computing network 100, any number of nodes can be deployed by a computing environment In computing network 100, pods 120-125 each comprise one or more containers (not shown) that are coupled to virtual switches 130-131 using veth pairs 150-151. The containers each comprise a standalone, executable package that includes elements required to execute an application, including code, runtime, system tools, system libraries, settings, and the like. The containers can be separated on nodes 110-111 using namespaces that can isolate the resources that are provided to the various containers or pods. For example, pod 120 can be allocated first resources that are associated with a first namespace, while pod 121 can be allocated second resources that are associated with a different namespace.

To support the communications for each of pods 120-125, veth pairs 150-151 are used, wherein the veth pairs act as a tunnel between the namespace associated with virtual switches 130-131 and the namespace associated with the corresponding pod. For example, a first veth pair is used to support pod 120, while a second veth pair is used to support pod 121 on node 121. Each veth pair can be associated with an IP that differentiates ingress and egress packets for a first pod from ingress and egress packets for a second pod. For example, pod 120 can be associated with the IP address 10.1.1.2/24, while pod 121 can be associated with IP address 10.1.1.3/24. Packets can be forwarded by virtual switches to an interface (i.e., virtual network interface for a veth pair) associated with the pods based on the destination address in the packet. Virtual switches can also provide further operations including firewall operations, whitelist operations, or other similar operations on identified packets. Virtual switch 130 can perform packet processing, such as multicast forwarding operations, for packets sent between pods located on the same node (i.e., host for the pods), between pods on different nodes, or between pods and external hosts 115 or other computing systems.

Here, one or more pods in computing network 100 can request to receive packets directed at a multicast IP address, wherein a multicast communication can be forwarded to multiple destination computing elements, including virtualized endpoints (containers, virtual machines, and the like) as well as physical computing systems. In registering with either of virtual switches 130-131, an agent of agents 170-171 can identify the registration for the pod and configure the local node to forward packets with the destination multicast IP address to the registered pod. The registration packet from the pod can comprise an Internet Group Management Protocol (IGMP) packet, a Multicast Listener Discovery (MLD) packet, or some other multicast registration packet that can identify the registration from the pod. In at least one example, IGMP packets are used for a cluster of pods that use IPv4 addressing, while MLD packets are used for a cluster of pods that use IPv6 addressing. Configuring the node may include configuring one or more forwarding rules for forwarding packets with the multicast IP address from a network interface of the node to the registered pod or may include configuring one or more forwarding rules for forwarding packets from other pods on the same node with the multicast IP address to the destination pod.

For example, when pod 125 registers with agent 171 with a first multicast IP address, agent 171 can generate one or more forwarding rules to forward packets with the first multicast IP address to pod 125. In some examples, node 111 can advertise to neighboring devices, such as routers (not shown) indicating the registration of the first multicast IP address permitting the neighboring devices to forward packets with the first multicast IP address as the destination address to network interface(s) 141 of node 111. Once received, virtual switch 131 can process the packets in accordance with the one or more forwarding rules to forward the packets to the virtual interface for pod 125. Similarly, if a packet is generated with a multicast IP address from pod 123, virtual switch 131 can identify the packet at the virtual interface for pod 123 (e.g., interface for the veth pair of pod 123 at virtual switch 131) and processing the packet in accordance with the one or more forwarding rules generated in response to the registration from pod 125. The one or more rules can forward the packet locally to pod 125.

FIG. 2 illustrates a method 200 of operating a node to register a pod for multicast communications and forward multicast packets to the pod according to an implementation. The steps of operation 200 are described parenthetically in the paragraphs that follow with reference to systems and elements of computing network 100. Although described using agent 171 and virtual switch 131 of node 111, similar operations can be performed by virtual switch 130, agent 170, and node 110.

Method 200 includes monitoring (201) for multicast and registration packets on node 111. The packets can comprise MLD packets, IGMP packets, or multicast packets that use the registered multicast destination IP address. As node 111 monitors for the packets, method 200 further includes identifying (202) a registration packet from a first pod of the pods on node 111. The registration can include at least a multicast IP address that indicates a multicast group that the pod requests to join. In node 111, each pod of pods 123-125 comprise one or more containers that are coupled to virtual switch 131 via veth pairs 151. The veth pair for each pod can be associated with an IP that differentiates the pod from other pods on the nodes. Specifically, each pod of pods 120-125 can correspond to a different IP address to direct ingress and egress packets to or from the pods using virtual switches 130-131. Pod 125 can generate a multicast registration packet, such as an IGMP packet, that indicates a multicast destination IP address requested by pod 125 or some other registration information associated with the multicast group associated with the multicast IP address.

After identifying a registration packet from a first pod, method 200 further provides configuring (203) one or more forwarding rules in a virtual switch to direct packets with the multicast IP address as a destination IP address to a virtual interface for the first pod. Once configured, method 200 also includes identifying or receiving (204) a packet with a multicast IP address as a destination IP address and directing the packet to the virtual interface for the first pod based on the one or more forwarding rules. In configuring node 111 for a multicast registration from pod 125, agent 171 can direct packets from network interface(s) 141 to the virtual interface associated with pod 125 and can also direct local multicast packets from pods 123-124 to pod 125 when the destination corresponds to the multicast IP address registered by pod 125. Additionally in some implementations, agent 171 can trigger node 111 to advertise to other connected devices, including switches coupled to node 111, to forward packets with the multicast IP address as a destination address to node 111. When a multicast packet is received at a network interface for node 111 with the destination IP address registered by pod 125, virtual switch 131 can forward the packet to the corresponding pod via the veth pair associated with the pod.

Although demonstrated in the example of method 200 as forwarding a packet received at a network interface of network interface(s) 141, virtual switch 131 can further process multicast packets to the pod 125 when a multicast packet with the requisite destination IP address is identified from another pod on the same node. For example, pod 123 can generate a multicast packet that is identified at virtual switch 131. In response to identifying the packet, virtual switch 131 can identify the multicast IP address in the destination of the packet and determine the packet is requested by pod 125 based on the one or more forwarding rules. Virtual switch 131 then directs the multicast packet to pod 125 based on the one or more forwarding rules using the virtual interface for pod 125.

In some implementations, the registrations of pods for multicast communications can be associated with a timeout period that removes the one or more forwarding rules to be removed at the expiration of the period. A pod can continue the registration for the multicast group by communicating additional registration packets that reset the timer associated with the timeout period. In another implementation, a registering pod, such as pod 125 can communicate an express notification, via an IGMP or other control packet, to remove the one or more forwarding rules associated with the multicast group. In response to identifying the notification at virtual switch 131, the one or more rules for the multicast group and destination multicast IP address can be removed, preventing future multicast packets from being delivered to the pod.

FIG. 3 illustrates a method 300 of a node to communicate a multicast packet to a second node according to an implementation. The steps of method 300 are referenced parenthetically in the parenthetically in the paragraphs that follow with reference to systems and elements of computing network 100 of FIG. 1. Although demonstrated using node 110, virtual switch 130, and agent 170, similar operations can be performed by node 111 and the corresponding software associated with node 111.

Method 300 includes identifying (301) a multicast packet from a pod on node 110. In response to the packet, virtual switch 130 performs packet inspect to determine whether the packet comprises a multicast packet, wherein the packet inspection can identify whether the packet includes a multicast destination IP address. In response to identifying the multicast packet, method 300 further includes configuring (302) one or more forwarding rules that direct the packet to an external interface and communicating (303) the multicast packet to a second node via the node interface.

As an example, virtual switch 130 can be configured by agent 170 to monitor for multicast related applications, wherein the packets can comprise registration packets to receive multicast communications or multicast packets that are to be delivered to one or more other computing elements including pods or other hosts. When a multicast packet is identified, virtual switch 130 can direct the packet locally to any other pod that registered for the multicast group or the network interface of node 111 to communicate the packet to pods on other nodes or external hosts 115. As an example, pod 120 can generate a multicast packet that is identified by virtual switch 130 after it is received at the virtual interface for pod 120 (i.e., the switch side interface for the veth pair with pod 120). If pod 125 has registered to receive multicast communications with the multicast address in the packet, virtual switch can direct the packet (and/or copies of the packet) to one of network interface(s) 140 for communication to node 111.

In addition to or in place of communicating the packet (and/or copies thereof) via the NIC 140, if another pod on node 110, such as pod 122 joined the multicast group, one or more forwarding rules can be used on virtual switch 130 to communicate the packet (or a copy) to the virtual interface of pod 122. The virtual interface corresponds to the veth pair for pod 122.

Although demonstrated in the previous example as communicating a multicast packet from a first pod to a second pod, multicast packets can also be communicated from a pod to an external host, wherein the external host can comprise a virtual machine or physical computer. For example, virtual switch 130 can identify a multicast packet from pod 120 and can forward the packet toward the external host based on the multicast address in the packet using a network interface of network interface(s) 140. In some examples, node 110 may further perform source network address translation if the packet is destined for a host external to the network associated with pods 120-125. Further, while pods 122 and 125 are demonstrated as receiving a multicast packet from another pod, pods 122 and 125 can receive packets from external hosts, including virtual machines and physical computers. Once registered for a multicast address, the virtual switch can identify packets received with the multicast address and forward the packets to the virtual interface associated with the registered pod. For example, node 111 can receive a multicast packet from an external host, identify that the packet includes multicast address 472 and forward the packet to pod 125.

Figure 4:
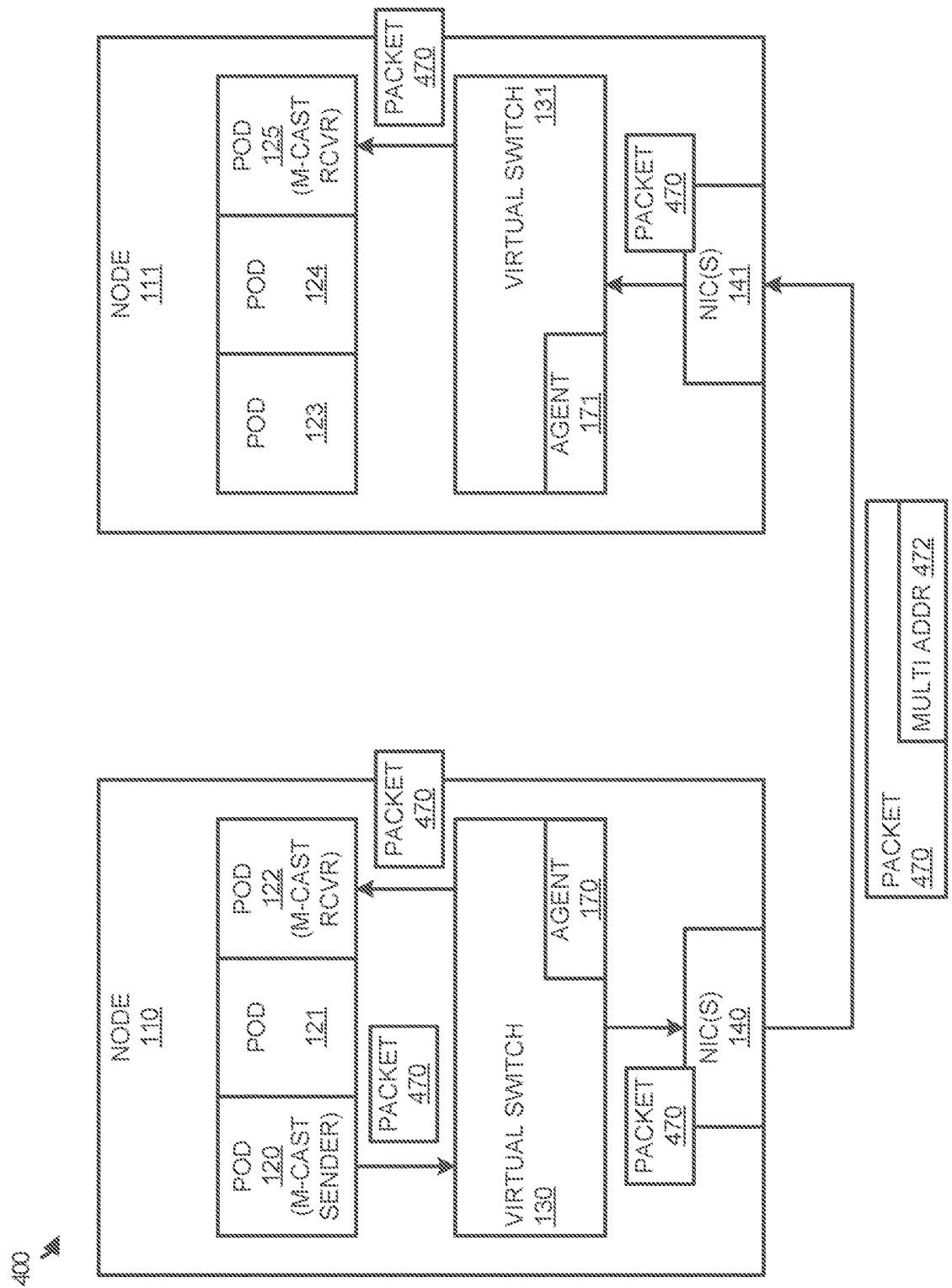
FIG. 4 illustrates an operational scenario of a packet flow from a first node to a second node according to an implementation.

FIG. 4 illustrates an operational scenario 400 of a packet flow from a first node to a second node according to an implementation. Operational scenario 400 includes nodes 110-111 from computing network 100 of FIG. 1. External hosts 115 have been omitted for clarity. Operational scenario 400 further includes packet 470 with multicast address 472 that corresponds to a destination multicast IP address.

In operational scenario 400, pod 120 generates a multicast packet 470 that is communicated via the veth pair to virtual switch 130. The multicast packet can be forwarded to other computing systems, pods, and the like in the network that have registered to receive packets with multicast address 472. When identified by virtual switch 130, virtual switch 130 can perform packet inspection to determine which route rule or rules apply to the packet. The forwarding rules for virtual switch 130 can be implemented based on the registrations or requests from executing pods in the computing network. In some examples, additional forwarding rules can be configured by an administrator. In the present example, packet 470 includes multicast address 472, which triggers one or more rules for distributing the packets to other pods and hosts in the computing network.

Here, virtual switch, based on forwarding table entries as described, forwards packet 470 to pod 122. For example, pod 122 may have previously registered as a receiver of multicast packets with multicast address 472. The registration can comprise an IGMP, MLD, or other multicast registration packet that is identified at virtual switch 130 and agent 170. Once registered, one or more rules (i.e., forwarding table entries) are established by agent 170 in virtual switch 130 to forward multicast packets with multicast address 472 to a port on virtual switch 130 connected to pod 122. The rules can be used in conjunction with packet inspection to identify the relevant multicast address 472 and forward the packet to the virtual interface associated with pod 122 based on the address.

In addition to communicating the packet to pod 122, virtual switch also forwards, via network interface(s) 140, packet 470 to node 111. In some implementations, pod 125 can communicate a registration packet that is identified by virtual switch 131. In response to identifying the registration packet, agent 171 can configure one or more forwarding rules that can direct packets received at network interface(s) 141 to a virtual interface associated with pod 125. In some examples, agent 171 may also permit (or cause) node 111 to communicate a notification to an external switch (not shown) indicating that packets with multicast address 472 should be forwarded to node 111. Multicast protocols are well known for propagating the multicast registrations through the network to ensure all devices on a path to a multicast source are configured to appropriately forward multicast packets to the group members. Here, when packet 470 is identified by node 110, the packet is processed by virtual switch 130 and communicated using network interface(s) 140 to a next hop, such as a switch. The switch in turn forwards the packet to node 111. Once received at node 111, virtual switch 131 can perform packet inspection to identify multicast address 472 in the packet and forward the packet to the virtual interface for pod 125 at node 111. The virtual interface may comprise a virtual interface in the namespace of virtual switch 141 that is coupled as a veth pair to another interface in the namespace for pod 125. The virtual interface for pod 125 in the namespace for virtual switch 131 can be associated with an IP but can also receive packets directed to multicast IP addresses registered by pod 125.

In some implementations, the multicast registrations from the pods can expire or can be explicitly terminated by the pods. For example, pod 125 can generate a notification packet (e.g., IGMP packet) that is identified by virtual switch 131. In response to identifying the packet, the one or more forwarding rules that direct packets associated with multicast address 472 can be terminated in association with pod 125, i.e., removed or marked as inactive or deleted. In another example, agent 171 can initiate a timer in response to receiving the request from pod 125 to join the multicast group associated with multicast address 472. When the timer expires, the one or more forwarding rules in virtual switch for the multicast address associated with pod 125 can be terminated (removed, deleted, or otherwise rendered inactive). As a result, future multicast communications will not be forwarded to the virtual interface associated with pod 125 on virtual switch 131. Alternatively, pod 125 may communicate a second notification packet to virtual switch 131 indicating a request to maintain the multicast path to pod 125. In response to receiving the second notification packet, the timer can be restarted, and the one or more forwarding rules can be maintained for virtual switch 131.

Figure 5:
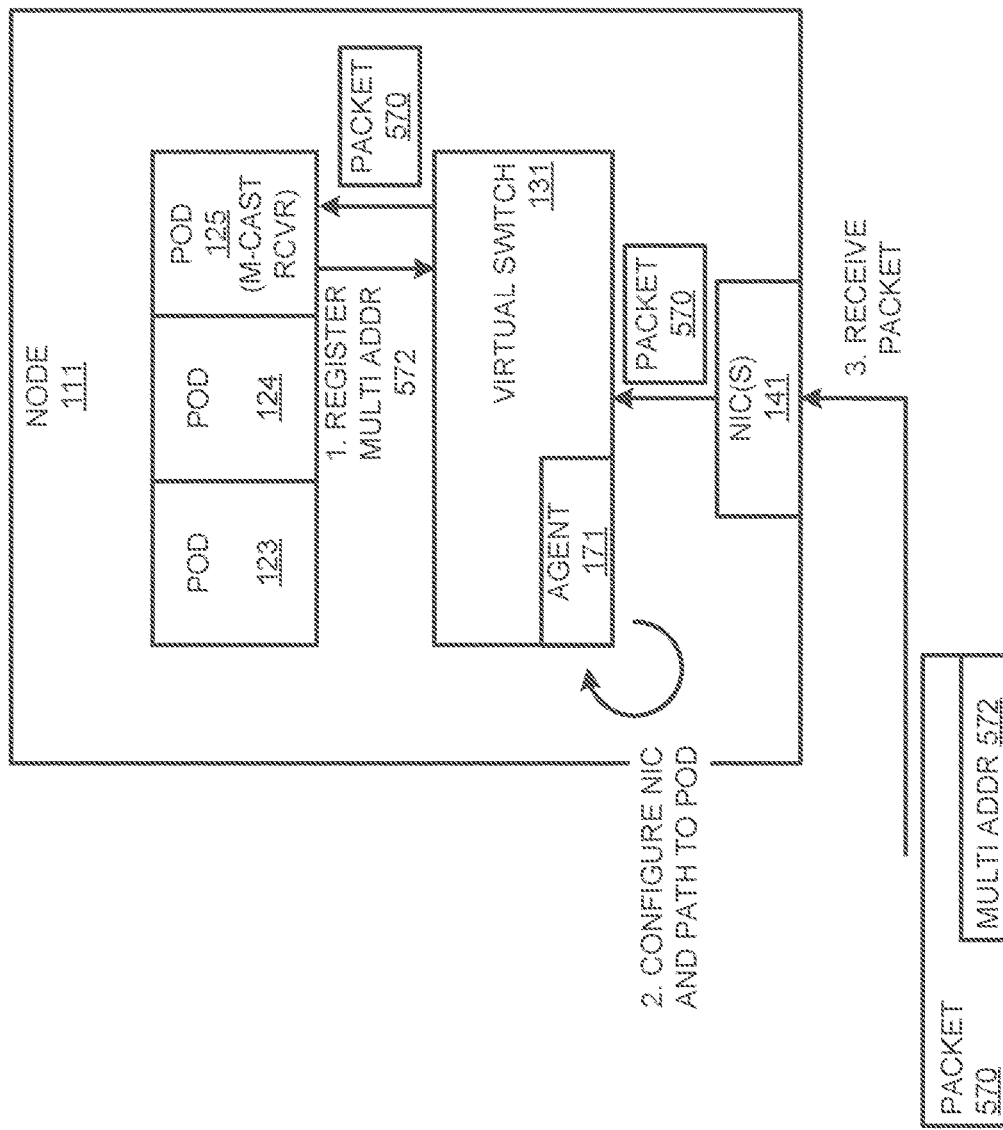
FIG. 5 illustrates an operational scenario of registering for and receiving multicast communications according to an implementation.

FIG. 5 illustrates an operational scenario 500 of registering for and receiving multicast communications according to an implementation. Operational scenario 500 includes node 111 from FIG. 1 with pods 123-125, virtual switch 131, agent 171, and network interface(s) (NIC(s)) 141. Operational scenario 500 further includes packet 570 with multicast address 572.

In operational scenario 500, pod 125 generates, at step 1, a packet to register pod 125 in a multicast group associated with multicast address 572. The packet can comprise an IGMP packet, MLD packet, or some other multicast registration packet that indicates a request to join a multicast group. Virtual switch 131 can monitor for the registration packet and, in response to the registration packet, configure, at step 2, one or more forwarding rules that are used to forward packets with multicast address 572 to pod 125. The multicast packets can be received from other pods coupled to virtual switch 131 via veth pairs or can be received at a network interface of network interface(s) 141 for node 111. In some implementations, node 111 can advertise to next hop elements, including a switch, indicating that packets with multicast address should be forwarded to node 111 and network interface(s) 141.

Here, packet 570 is communicated from a first node and received by node 111 at step 3. In response to receiving the packet, virtual switch 131 performs packet inspection and applies forwarding rules on the packet, including the one or more forwarding rules configured based on the registration from pod 125. In response to identifying multicast address 572, virtual switch 131 can direct packet 570 to the virtual interface associated with pod 125 based on the one or more rules. The virtual interface can be used as a tunnel to move the packet from the namespace associated with virtual switch 131 to the namespace associated with the one or more containers in pod 125.

After pod 125 registers for the multicast group, a timer can be created by 171, wherein the timer can be used to remove rules that are no longer required in virtual switch 131. The timer can be defined by an administrator of the computing network, can be defined in the initial registration packet from pod 125, or can be defined by some other mechanism. For example, when pod 125 generates the registration request that is identified by virtual switch 131, agent 131 can initiate a timer that is used in association with a timeout period to remove the one or more rules configured for pod 125. At the expiration of the period, agent 171 can remove the one or more rules, preventing future packets from being forwarded to pod 125. To restart the timer, pod 125 can communicate a second registration packet to maintain the one or more forwarding rules forwarding multicast packets to pod 125. Pod 125 can communicate additional registration packets as required to maintain the one or more forwarding rules for the multicast packets.

In some examples, host 111 may determine whether pods 123-124 also require the receipt of packets to multicast address 572 after removing the one or more forwarding rules associated with pod 125. Specifically, if no other pods on node 111 require the receipt of multicast packets with multicast address 572, host 111 can indicate to an external switch that packets with multicast address 572 are not required by host 111. In contrast, if another pod requires the receipt of the multicast packets with multicast address 572, then the multicast packets can continue to be received by host 111 and forwarded to the registered pod.

In another implementation, pod 125 can expressly indicate in a request that it no longer requires the receipt of multicast packets with multicast address 572. Pod 125 can communicate using an IGMP or MLD packet or some other control packet to virtual switch 131. In response to identifying the packet, the one or more forwarding rules associated with pod 125 and multicast address 572 can be removed from node 111. Additionally, depending on whether pods 123-124 have requested packets associated with multicast address 572, node 111 may notify a next hop gateway to stop the communication of packets with multicast address 572 as the destination address to node 111.

Although demonstrated as receiving packet 570 from another node, multicast packets can be received from external hosts or systems, including virtual machines and physical computers. For example, a multicast packet can be received at a network interface of network interface(s) 141 and can be forwarded to a virtual interface for pod 125 based on the one or more forwarding rules generated in response to a registration packet from pod 125.

Figure 6:
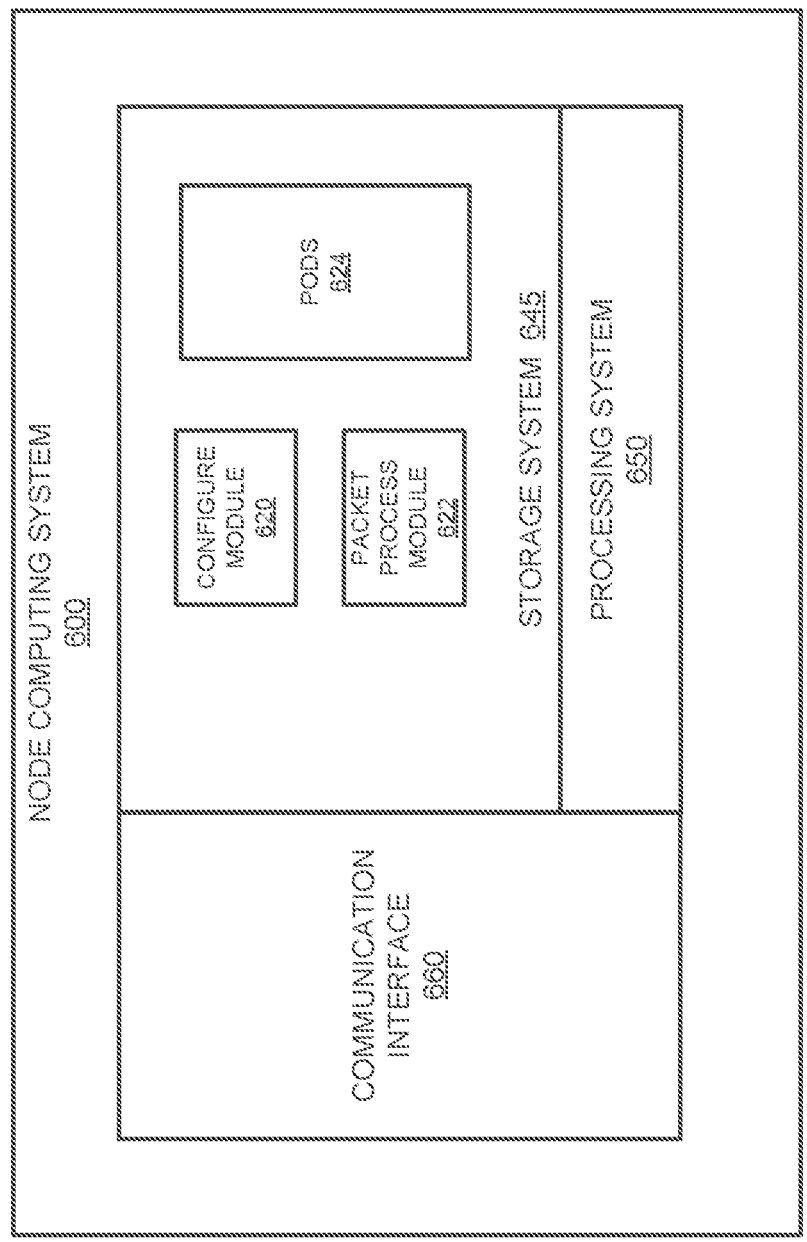
FIG. 6 illustrates a node computing system to manage multicast connections for containers according to an implementation.

FIG. 6 illustrates a node computing system 600 to manage multicast connections for containers according to an implementation. Node computing system 600 is representative of any computing system or systems with which the various operational architectures, processes, scenarios, and sequences disclosed herein for node can be implemented. Node computing system 600 is an example of nodes 110-111 of FIG. 1, although other examples may exist. Node computing system 600 includes storage system 645, processing system 650, and communication interface 660. Processing system 650 is operatively linked to communication interface 660 and storage system 645. Communication interface 660 may be communicatively linked to storage system 645 in some implementations. Node computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other nodes, hosts, or other computing systems, wherein the computing systems can be in the same datacenter or another datacenter.

Processing system 650 comprises microprocessor and other circuitry that retrieves and executes operating software from storage system 645. Storage system 645 may include volatile and nonvolatile, removable, and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises configure module 620, packet process module 622, and pods 624. The operating software on storage system 645 may further include an operating system, utilities, drivers, network interfaces, applications, or some other type of software. When read and executed by processing system 650 the operating software on storage system 645 directs node computing system 600 to operate as a management service described herein in FIG. 1-5.

In at least one implementation, configure module 620 directs processing system 650 to monitor for registration packets from pods 624 on the node computing system to join a multicast group. While monitoring for the registration packets, configuring module 620 directs processing system 650 to identify a registration packet from a first pod of pods 624, wherein the registration packet indicates a multicast IP address or multicast group for the first pod. The registration packets can comprise IGMP packets, MLD packets, or some other multicast registration packets that can indicate registration information for the first pod.

In response to identifying the registration packet, configure module 620 directs processing system 650 to configure one or more forwarding rules in a virtual switch to direct packets with the multicast IP address as a destination IP address to a virtual interface for the first pod. The multicast IP addresses can be received locally from another pod in pods 624 or can received from an external node or another pod executing thereon.

Once configured, packet process module 622 directs processing system 650 to receive a packet with the multicast IP address as a destination IP address and direct the packet to the virtual interface for the first pod based on the one or more forwarding rules. The received packet can be received at a network interface for the node (e.g., transport network interface) or can be received at another virtual interface for another pod on the node. The virtual interface corresponds to a veth pair associated with another pod, wherein a first interface is in the namespace for the pod and the second interface is in the namespace for the virtual switch.

In some implementations, the registration for the multicast communications can expire based on a timeout associated with the registration. When the first registration packet is received from the pod, configure module 620 directs processing system 650 to initiate a timer to expire or retire the registration. If a second registration is received prior to the expiration of the time, configure module 620 can direct processing system 650 to restart the timer. If a second registration is not received, then configure module 620 can direct processing system 650 to delete or remove the one or more forwarding rules that direct the multicast packets to the virtual interface associated with the pod. In an alternative example, if no multicast communications are identified with the registered multicast IP address, then configure module 620 may determine that the registration is dormant and remove the one or more forwarding rules that direct the multicast packets to the requesting pod.

In another implementation, the requesting pod can provide a notification that indicates a request to be removed as a destination for a multicast IP address. The notification may comprise an IGMP packet that is identified by configure module 620, which triggers the removal of one or more rules to direct the packets to the pod. In some examples, when removing the one or more rules, the node may communicate with an external switch for node computing system 600 indicating that the multicast communications are no longer required to be forwarded to the node. In some examples, the notification to the switch only occurs when all pods at the node have indicating that the multicast communications are not required. For example, while a first pod can indicate that multicast packets associated with a first multicast IP addresses are no longer required, a second pod can still require the multicast packets associated with the first multicast IP address. Consequently, node computing system 600 will not communicate a notification to the external switch or gateway, permitting node computing system 600 to continue receiving the multicast packets with the first multicast IP address and forward the packets to the virtual interface associated with the second pod.

In addition to or in place of the operations of identifying and forwarding a packet to a pod executing locally at node computing system 600, packet process module 622 can direct processing system to monitor for multicast packets received via communication interface 660 or from a local virtual interface associated with a veth pair for a pod of pods 624. In response to identifying the multicast packets, packet process module 622 directs processing system 650 to forward the packet to another virtual interface associated with another pod, if the other pod has registered for the multicast group associated with the multicast packet. Packet process module 622 can further direct the communication to be communicated via communication interface 660 to another node, when a switch indicates the multicast IP address should be communicated to another node. In some examples, in forwarding via communication interface 660, node computing system 600 can perform source network address translation to translate the source IP address of the packet to a source address associated with node computing system 600. The packet can then be communicated over the network to one or more other nodes and hosts.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
in a first node, monitoring for registration packets from pods on the first node to join a multicast group;
in the first node, identifying a registration packet from a first pod of the pods, wherein the registration packet indicates a multicast IP address;
in the first node and in response to the registration packet, configuring one or more forwarding rules in a virtual switch to direct packets with the multicast IP address as a destination IP address to a virtual interface for the first pod; and
in the first node, identifying a packet with the multicast IP address as a destination IP address;
in the first node, communicating a notification to an external switch indicating that packets with the multicast address should be forwarded to the first node; and
in the first node, directing the packet to the virtual interface for the first pod based on the one or more forwarding rules.

2. The method of claim 1, wherein the registration packets comprise Internet Group Management Protocol (IGMP) packets or Multicast Listener Discovery (MLD) packets.

3. The method of claim 1 further comprising:
in the first node, identifying an expiration of a timeout period for the registration packet; and
in the first node, removing the one or more forwarding rules in response to identifying the expiration.

4. The method of claim 1 further comprising:
in the first node, receiving a notification from the first pod indicating a request to remove the first pod from the multicast group; and
in the first node, removing the one or more forwarding rules in response to the notification.

5. The method of claim 4, wherein the notification comprises an Internet Group Management Protocol (IGMP) packet.

6. The method of claim 1 further comprising:
in the first node, initiating a timeout timer in response to identifying the registration packet;
in the first node, identifying a second registration packet from the first pod, wherein the registration packet indicates the multicast IP address; and
in the first node, restarting the timeout timer in response to the second registration packet.

7. The method of claim 1 further comprising:
in a second node, identifying the packet with the multicast IP address as a destination IP address from a second pod on the second node; and
in the second node, communicating the packet via a network interface to the second node.

8. The method of claim 1, wherein the node comprises a virtual machine or a physical computer.

9. A computing apparatus comprising:
a storage system;
a processing system operatively coupled to the storage system; and
program instructions stored on the storage system that, when executed by the processing system, direct the processing system to:
in a first node, monitor for registration packets from pods on the first node to join a multicast group;
in the first node, identify a registration packet from a first pod of the pods, wherein the registration packet indicates a multicast IP address;
in the first node and in response to the registration packet, configure one or more forwarding rules in a virtual switch to direct packets with the multicast IP address as a destination IP address to a virtual interface for the first pod; and
in the first node, identify a packet with the multicast IP address as a destination IP address;
in the first node, communicate a notification to an external switch indicating that packets with the multicast address should be forwarded to the first node; and
in the first node, direct the packet to the virtual interface for the first pod based on the one or more forwarding rules.

10. The computing apparatus of claim 9, wherein the registration packets comprise Internet Group Management Protocol (IGMP) packets or Multicast Listener Discovery (MLD) packets.

11. The computing apparatus of claim 9, wherein the program instructions further direct the computing apparatus to:
in the first node, identify an expiration of a timeout period for the registration packet; and
in the first node, remove the one or more forwarding rules in response to identifying the expiration.

12. The computing apparatus of claim 9, wherein the program instructions further direct the computing apparatus to:
in the first node, receive a notification from the first pod indicating a request to remove the first pod from the multicast group; and
in the first node, removing the one or more forwarding rules in response to the notification.

13. The computing apparatus of claim 12, wherein the notification comprises an Internet Group Management Protocol (IGMP) packet.

14. The computing apparatus of claim 9, wherein the program instructions further direct the computing apparatus to:
in the first node, initiate a timeout timer in response to identifying the registration packet;
in the first node, identify a second registration packet from the first pod, wherein the registration packet indicates the multicast IP address; and
in the first node, restart the timeout timer in response to the second registration packet.

15. A system comprising:
a first node computer; and
a second node computer communicatively coupled to the first node computer and configured to:
monitor for registration packets from pods on the first node to join a multicast group;
identify a registration packet from a first pod of the pods, wherein the registration packet indicates a multicast IP address;
in response to the registration packet, configure one or more forwarding rules in a virtual switch to direct packets with the multicast IP address as a destination IP address to a virtual interface for the first pod; and
receive a packet with the multicast IP address as a destination IP address;
communicate a notification to an external switch indicating that packets with the multicast address should be forwarded to the second node; and direct the packet to the virtual interface for the first pod based on the one or more forwarding rules.

16. The system of claim 15, wherein the registration packets comprise Internet Group Management Protocol (IGMP) packets.

17. The system of claim 15, wherein the second node computer is further configured to:
   identify an expiration of a timeout period for the registration packet; and
   remove the one or more forwarding rules in response to identifying the expiration.

18. The system of claim 15, wherein the second node computer is further configured to:
   receive a notification from the first pod indicating a request to remove the first pod from the multicast group; and
   removing the one or more forwarding rules in response to the notification.

19. The system of claim 15, wherein the second node computer is further configured to:
   initiate a timeout timer in response to identifying the registration packet;
   identify a second registration packet from the first pod, wherein the registration packet indicates the multicast IP address; and
   restart the timeout timer in response to the second registration packet.

20. The system of claim 15, wherein the first node computer is further configured to:
   identify the packet with the multicast IP address as a destination address from a second pod; and
   communicate the packet via a network interface of the first node computer.

* * * * *